United States Patent [19]

Semanchik et al.

[11] 4,105,637

[45] Aug. 8, 1978

[54] PROCESS FOR PRODUCING A POLYACETAL POLYMER

[75] Inventors: Michael Semanchik, Lebanon; David M. Braunstein, Fanwood, both of N.J.

[73] Assignee: Celanese Corporation, New York, N.Y.

[21] Appl. No.: 514,146

[22] Filed: Oct. 11, 1974

[51] Int. Cl.$^2$ .............................................. C08G 2/10
[52] U.S. Cl. .................................. 528/241; 528/249; 528/250; 526/64
[58] Field of Search ...................... 260/67 FP; 264/13

[56] References Cited

U.S. PATENT DOCUMENTS

| | | | |
|---|---|---|---|
| 3,253,818 | 5/1966 | Seddon et al. | 260/67 FP X |
| 3,254,053 | 5/1966 | Fisher et al. | 260/67 FP |
| 3,442,866 | 5/1969 | Seddon et al. | 260/67 FP |

*Primary Examiner*—Lucille M. Phynes
*Attorney, Agent, or Firm*—Marvin Bressler; Linn I. Grim; T. J. Morgan

[57] ABSTRACT

A process for producing a polyacetal polymer. The process includes reacting a polyacetal forming polymerization mixture in a polymerization reaction zone, which zone includes an elongated casing substantially following the outer boundaries of at least a pair of shafts, each of the shafts provided with a plurality of intermeshing elliptical shaped plates having flattened edges at the major axis which mesh, wiping the surface of its mating plate. The polymerization mixture is polymerized to form a polyacetal product in the form of a finely divided solid.

18 Claims, 6 Drawing Figures

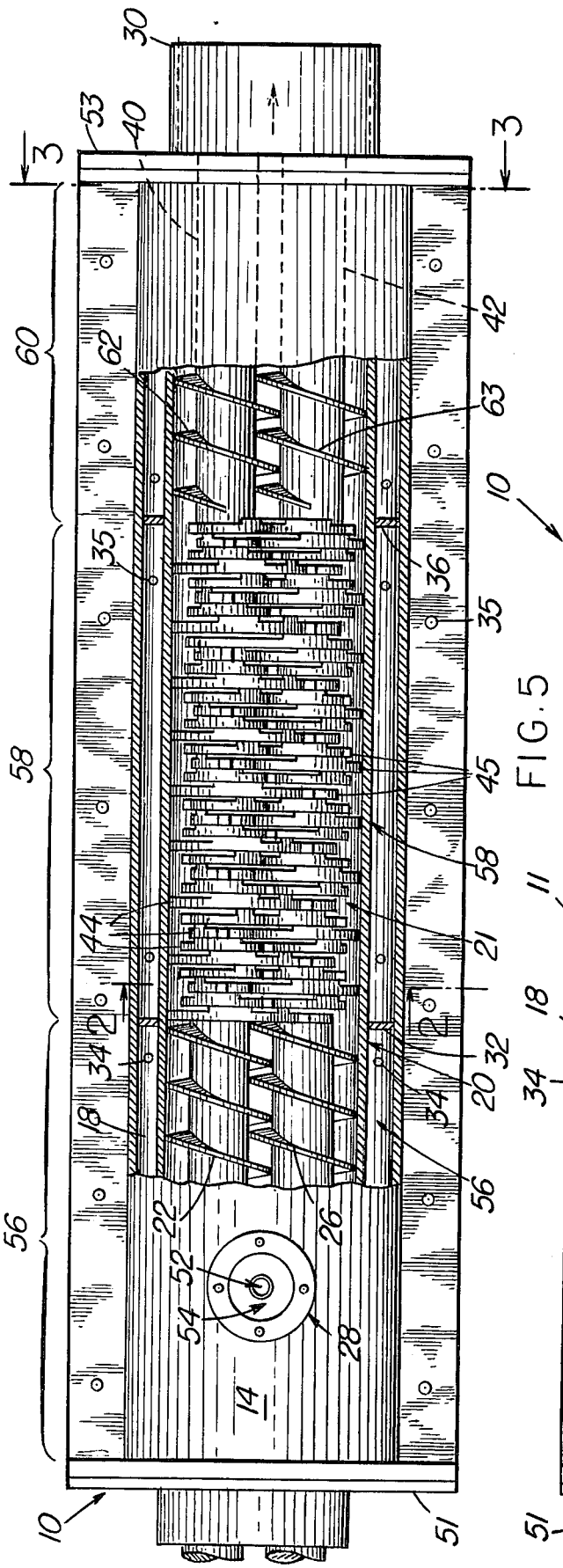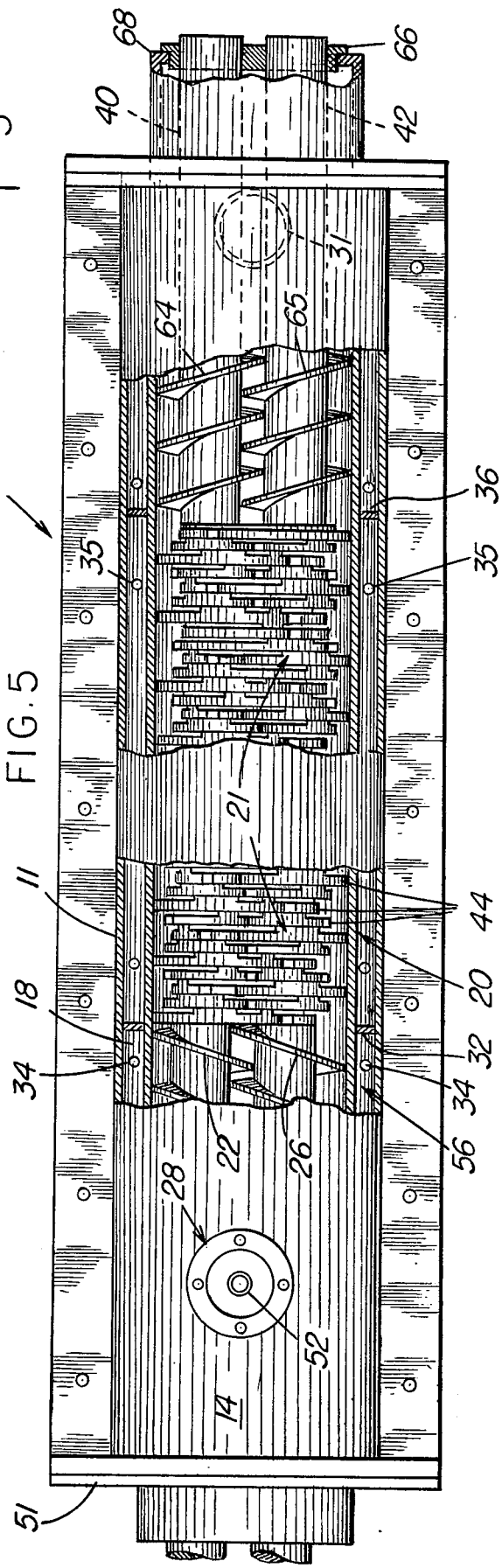

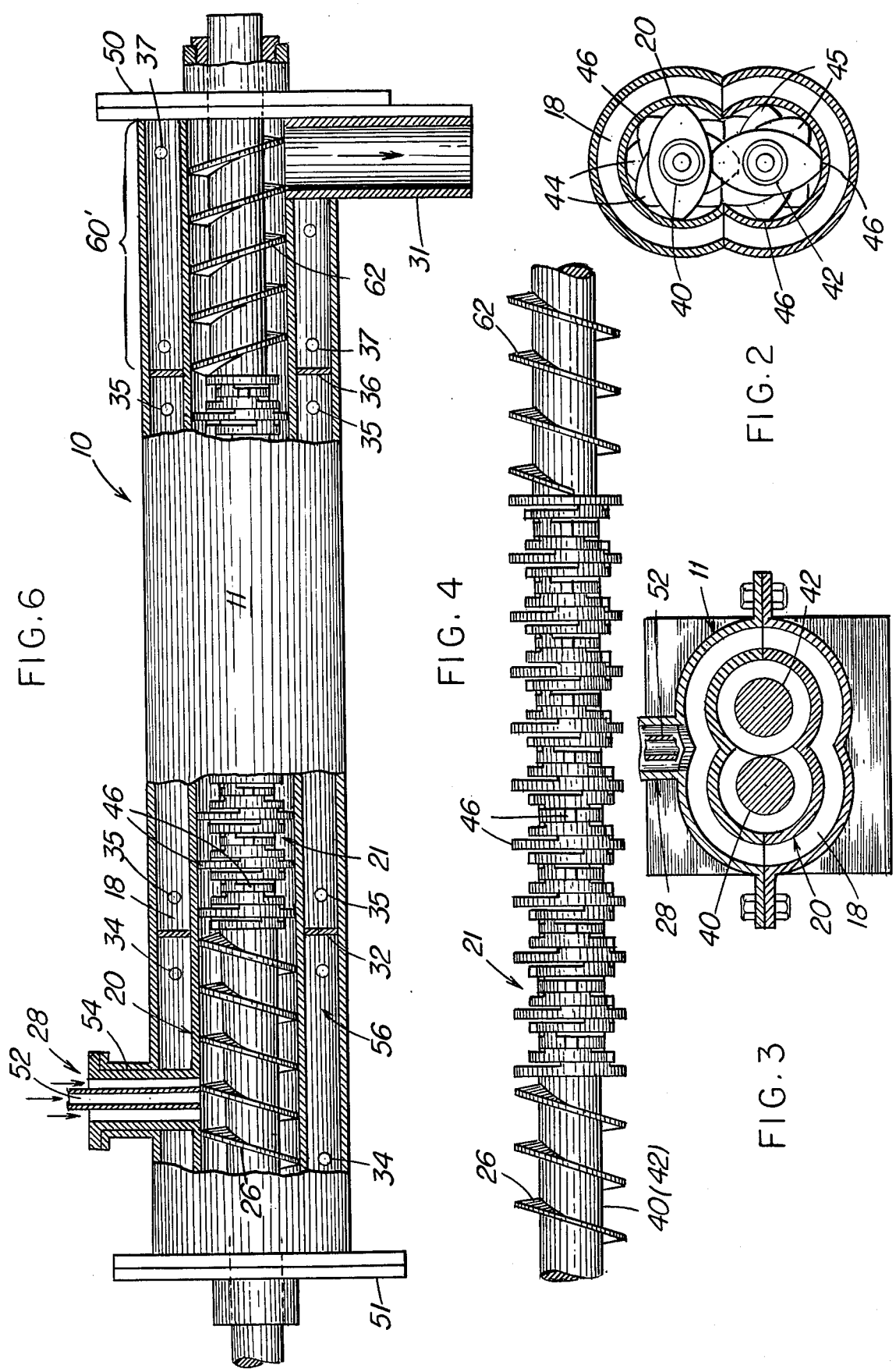

PROCESS FOR PRODUCING A POLYACETAL POLYMER

BACKGROUND OF THE DISCLOSURE

1. Field of the Invention

The instant invention is directed to a process for producing a polyacetal polymer. More specifically, the instant invention is directed to a process for producing a polyacetal polymer by reacting a polyacetal forming polymerization mixture in a reaction zone in which at least a pair of shafts each provided with a plurality of intermeshing elliptical shaped plates are provided. Still more specifically, the instant invention is directed to a process for producing a polyacetal copolymer in which a polyacetal copolymer forming polymerization mixture is reacted in a reaction zone in which the reactants are reacted in the presence of at least a pair of shafts each provided with a plurality of intermeshing elliptical shaped plates.

2. Background of the Prior Art

Polyacetal polymers represent a very important class of engineering resins which have been known for many years and are disclosed in, for example, Kern et al., Angewandt Chemie 73, pp. 176–186 (Mar. 21, 1961), and Sittig, M., Hydrocarbon Process and Petroleum Refiner 41, pp. 131–170 (1962). The importance of polyacetal resins as a commercial product is in no small part due to its unique combination of physical properties. The stiffness, toughness and inertness of polyacetal resins has resulted in widespread use in molded and extruded objects. Polyacetal polymers are formed by polymerization in the liquid phase, and in the presence of a suitable polymerization catalyst. During polymerization, the polymer forms as a solid or highly viscous polymeric mass substantially filling the entire volume of the reactor. Such a processing procedure is unattractive in view of the difficulty of maintaining proper temperature control of the solidified polymeric mass. In addition, further processing, such as washing or purification, requires that the solid polymer mass be ground, chopped or pulverized. This is costly and oftentimes commercially impractical in view of the extreme toughness of the polymer.

An alternate process for producing polyacetal polymers, which avoids the problems discussed above, is to dilute the polymerization mixture with a large amount of an inert solvent which prevents solidification of the reactant mass. Besides, the obvious problems associated with employment of large amounts of solvent, such as high cost, toxicity, explosion potential and the like, the use of large amounts of inert solvents results in lower molecular weight products as well as decreased polymerization rates. For this reason, the employment of significant quantities of solvent has not been looked upon as a variable alternative for successful production of polyacetal polymers.

To overcome the problems associated with highly viscous polyacetal products, without resorting to the use of large quantities of solvent, several processing schemes have been suggested in the prior art. Among these useful processing schemes in one suggested by Seddon and Russell in U.S. Pat. No. 3,253,818 issued on May 31, 1966. In this patent, a process is suggested which employs, as a reactor, a cylindrical barrel in which a screw member, coaxial with the barrel and provided with a plurality of interrupted threads causes reaction of the polymerization reactants by moving the polymerization mixture, disposed in the interruptions between the projections of the screw, over teeth which project from the inner surface of the barrel. This represents an improvement over the prior methods of production producing polyacetal polymers. However, the degree of mixing attained by this method still leaves something to be desired. As those skilled in the art are aware, unless good mixing is attained the reaction mixture does not adequately contact the cooling surface of the outer wall resulting in elevated reaction temperatures. Oftentimes, if the reaction temperature is too high, the monomer or monomers boil thus presenting the undesirable case wherein the monomer is in the gaseous state and the catalyst in the liquid state. Obviously, such a condition results in minimum contact. This, in turn, requires the introduction of greater quantities of catalysts, with the attendent cost and processing problems associated therewith. But, of even greater significance, it results in lower conversion rates. The conversion rate, of course, is the most critical parameter in polymerization processing.

Although the process discussed above represented a significant advance in the art, the problems associated with this processing scheme encouraged the development of other processing procedures which attempted to produce polyacetal polymers without significant employment of solvent. U.S. Pat. No. 3,442,866 issued on May 6, 1969 to Seddon and Scarbrough suggested the alternative processing scheme wherein a reactor was designed which comprised a pair of intermeshing parallel screw members disposed in an elongated case. The screw members had their threads running in the same direction and longitudinally rotated in that same direction. This scheme represents an improvement in terms of better mixing of the reactants to produce a lower reaction temperature. However, the design employed oftentimes does not produce sufficient grinding and/or pulverizing so that the original problems associated with a thick polymeric mass remain. That is manifested in the high horsepower requirements to move the polymeric mass through the reactor. Oftentimes, such a reactor "torques out". That is, the power supplied by the motor is insufficient to transport the polyacetal polymer product to the outlet of the reactor, plugging the reactor.

The above remarks suggest the need for a new process for producing polyacetal polymers which produce a finely divided product, produced without significant use of solvents, which may be conveyed through the reactor at temperatures lower enough to provide excellent conversion rates and low catalyst usage while providing sufficient grinding and pulverization so as to prevent the need for extraordinary power capacity.

SUMMARY OF THE INVENTION

The instant invention is directed to a process for producing a finely divided polyacetal product, without significant use of solvents, which product is produced by reactants which are conveyed through a reaction zone at temperatures low enough to provide high conversion rates at minimum catalyst usage and requiring relatively low power requirements.

In accordance with the instant invention a process is provided for producing a polyacetal polymer. The process includes the steps of introducing a polyacetal forming polymerization mixture into a polymerization reaction zone. The reaction zone comprises an elongated casing substantially following the outer boundaries of a pair of shafts, each of the shafts provided with a plurality of intermeshing elliptical shaped plates having flattened edges at the major axis which mesh, wiping the surface of its mating plate. The process further includes the step of polymerizing the polymerization reaction in the reaction zone to form the polyacetal product in the form of finely divided solids. The final step in the process is the withdrawing of the finely divided polyacetal solids from the reaction zone.

The process of this invention is particularly appropriate for use in the production of a polyacetal copolymer which includes at least 60 mole percent of recurring —$CH_2O$— units and from about 0.4 to about 15 mole percent of —OR— units wherein R is a divalent radical containing at least 2 carbon atoms directly linked to each other.

BRIEF DESCRIPTION OF THE DRAWINGS

The instant invention may be better understood with reference to the accompanying drawings of which:

FIG. 1 is a top view of the polymerization reactor with cut-away portions showing the location of the shaft members;

FIG. 2 is a sectional view of the polymerization reactor taken along plane 2—2 of FIG. 1;

FIG. 3 is a sectional end view of the polymerization reactor taken along plane 3—3 of FIG. 2;

FIG. 4 is a fragmentary view of a shaft employed in the polymerization reactor of FIG. 4;

FIG. 5 is a top view of another preferred embodiment of the polymerization reactor with cut-away portions showing the location of the shaft members; and FIG. 6 is a side elevation view with cut-away portions of the polymerization reactor of FIG. 5.

DETAILED DESCRIPTION

Turning now to the drawings, FIGS. 1, 2 and 3 depict the polymerization reactor of this invention, generally indicated at 10. The reactor 10 includes an outer jacket 11. Within the reactor 10 is enclosed an elongated casing 20 which is positioned within the reactor. The casing 20 defines an annular space 18 between the casing 20 and the outer jacket 11. Within the casing 20 are disposed a pair of intermeshing shafts generally indicated at 21. The first shaft 40 is parallel to the second shaft 42 and both are in axial alignment with the elongated casing 20.

The reactor 10 includes an inlet nozzle 28 provided for the introduction of the polymerization feed materials into the casing 20. The nozzle 28 is shown in detail in FIG. 6. The inlet nozzle 28 is shown in detail in FIG. 6. The inlet nozzle 28 includes a center conduit 52 which is provided for feeding, into the elongated casing 20, of the catalyst as will be described hereinafter. The inlet nozzle 28 furthermore includes an outer wall 54. In a preferred embodiment the outer wall is cylindrical.

The polymerization reactor 10 is divided into three separately temperature controlled zones. The first, denoted the inlet zone is generally indicated at 56. It includes the portion of the reactor bounded upstream by the upstream end 51 of the reactor and downstream by a separating plate 32. The separating plate 32 thermally isolates the upstream end of the space 18 defining the inlet zone 56. That is, the temperature inside the elongated casing 20 between the upstream end 51 and the plate 32 is controlled by a suitable fluid maintained at a fixed temperature, which occupies the space 18 in the inlet zone 56. As shown in the drawings, couplings 34 are provided to permit ingress and egress of a suitable heat transfer medium in the space occupied between the upstream end 51 of the reactor and the downstream boundary provided by separating plate 32. Similarly, a second zone is provided in the reactor 10. This is the polymerization reaction zone, generally indicated at 58. The reaction zone 58 is that portion of the reactor 10 in which the actual polymerization reaction occurs. The reaction zone 58 is defined by the separating plate 32, at the upstream end, and a separating plate 36, at the downstream end. Again, temperature control is provided by a suitable transfer medium which occupies the space 18 defined by annular walls 20 and 11 and plates 32 and 36. Obviously, the temperature in the reaction zone 58 is different from the temperature in the inlet zone 56. Again, means for ingress and egress of the heat transfer medium are provided by inlet and outlet means 35, which are preferably couplings which communicate with the heat transfer medium used.

The final zone of the reactor 10 is the outlet zone generally indicated at 60. The outlet zone comprises the downstream end of the reactor 10 and is defined at its upstream end by the separating plate 36 and the outlet end of the reactor 53. As in the other two zones, this zone is provided with a means for inlet and outlet of a suitable heat transfer medium. The inlet and outlet means are denoted in the drawings at 37. In a preferred embodiment, the inlet and outlet means 37 again comprises a plurality of couplings.

Included within the outlet zone 60 is an outlet means. In one preferred embodiment illustrated in FIG. 1, the outlet means comprises a nozzle 30 coaxial with the casing 20. That is, the outlet nozzle 30 is actually downstream of the downstream end of the shafts 21. This disposition will be explained in greater detail hereinafter.

A second preferred outlet zone, denoted at 60 is provided with an alternate outlet means illustrated in the drawings at FIGS. 5 and 6 wherein the outlet means comprises an outlet nozzle 31. In this second preferred embodiment, the outlet means 31 communicates normally with the reactor shafts 21.

Turning now to the unique shaft design of the instant invention, FIGS. 1 and 5 depict a pair of coacting shaft members 21. The pair of screw members 21 include a first parallel shaft member 40 and a second parallel shaft member 42 which coact with each other. In a preferred embodiment the shafts 40 and 42 are hollow to permit suitable heat transfer fluids to circulate therewithin. Sprockets (not shown) are mounted on the shafts 40 and 42 respectively for the rotation in the same direction of the shafts 40 and 42 by any suitable driving means (not shown).

As the upstream end of the shafts 40 and 42 are appended threaded screwes 22 and 26 respectively. Threaded screw 22 is attached to shaft 40 intermeshes with the threaded screw 26 attached to the parallel second shaft 42. By rotation of the shafts 40 and 42 in the same direction the two screws convey the reactants and the catalyst into the reaction zone.

Disposed immediately downstream of the threaded screws 22 and 26 are a plurality of elliptical shaped plates generally indicated at 44. Each of the elliptical shaped plates attached to the shaft is provided with a flattened edge 46 at each end of the major axis of the elliptical shaped plates. Each adjoining plate is offset from each other. In one preferred embodiment such plate is offset 45 degrees. That is, the angle formed between the major axis adjacent elliptically shaped plates 44 is 45°. This preferred embodiment is illustrated at FIG. 2. In another preferred embodiment the offset is 90°. In this case the major axis of adjoining plates are 90° apart. In still another preferred embodiment the offset between adjoining plates is 60°.

Disposed downstream of the elliptical plates 44 on shafts 40 and 42 is one of two preferred screw designs. The first, denoted at 62 and 63 on shafts 40 and 42 respectively comprises a flight of threaded screws of the same type as employed at the upstream end of the shaft. The flight of threaded screws 62 and 63 direct flow in the same direction as the direction of the upstream screws 22 and 26 and are employed in conjunction with the coaxial outlet 30 described above and illustrated in FIG. 1.

In the second preferred embodiment the outlet end of the shafts 40 and 42 comprise a flight of screws, similar to the threaded screws employed at the upstream end of the shafts but disposed in the reverse direction. The reverse flight of screws, denoted as 64 and 65, on shafts 40 and 42 respectively, is illustrated in FIG. 5. The employment of reverse flights of threaded screws 64 and 65 combine with a normally disposed nozzle 31 illustrated in FIG. 5. This second preferred embodiment provides another additional useful feature. That is, the shafts 40 and 42 are provided with an outboard bearing which is accommodated in a bearing collar 68 which is fastened to the inside surface of the casting 20 as illustrated in FIG. 5. This design provides assurance against movement of the shafts in the radial direction due to cantilever effects.

The above described reactor 10 is employed in a process for producing acetal polymers. Within the contemplation of this invention acetal polymers are those polymers which contain all or a majority, on a molar basis, of recurring oxymethylene (—CH$_2$O—) units. In a preferred embodiment of the process of this invention, the polyacetal polymer formed is a copolymer in which different units other than the oxymethylene units are present in the polymer chain. It is preferred that the polyacetal resin produced by the process of this invention include between about 60 and 99.6 mole percent of recurring oxymethylene units. The remaining recurring units are preferably a (—C—C—) bond or other structural units less susceptible to thermal degradation than oxymethylene units. Preferably, the structural unit other than the oxymethylene units is present in a concentration of up to about 15 mole percent. Most preferably, the polyacetal is an oxymethylene copolymer containing between about 85 and 99.6 mole percent of recurring oxymethylene units interspersed in a chain with from about 0.4 to about 15 mole percent of —OR— units wherein R is a divalent radical containing at least two carbon atoms directly linked to each other and positioned in the chain between the two valences, with any substituents in the R radical being inert. Preferably, such substituents include hydrocarbons or halohydrocarbons which are inert with respect to formaldehyde under the conditions of polymerization.

Copolymers of the desired structure may be prepared by polymerizing trioxane together with a cyclic ether having adjacent carbon atoms as disclosed in U.S. Pat. No. 3,027,352, Walling et al. A particularly preferred class of comonomers are those cyclic ethers having the structure

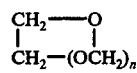

wherein n is an integer from zero to two.

Among the specific cyclic ethers which may be used in the present invention are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl formal; paraldehyde; tetrahydrofuran; and butadiene monoxide.

These and other materials may be used with trioxane to form copolymers including terpolymers as well as polymers composed of more than three different monomers. For example, polyacetal terpolymers may suitably contain at least 85 mole percent of oxymethylene units interspersed in a polymeric chain with up to about 15 mole percent of —OR— units, wherein R is a divalent radical containing at least two carbon atoms directly linked to each other and positioned in the chain between the two valences, with any substituent in the R radical being inert, and at least 0.01 up to 7.00 mole percent of said —OR— units of one chain having carbon atoms linked to another chain. More specifically, the above-mentioned class of cyclic ethers may be used with polyepoxides and similar materials to form terpolymers as disclosed in the now abandoned U.S. Pat. application Ser. No. 229,715 filed Oct. 10, 1962 by W. E. Heinz et al., which application is assigned to the same assignee as the subject application.

The copolymers described above may also incorporate other interspersed monomeric units derived from lactones, carbonates, cyclic and hydrates or ethylenically unsaturated compounds such as styrene, diformal ether, vinyl acetate, vinyl methyl ketone or acrolein, as disclosed in the above mentioned Kern et al. article. Further, the polymers and copolymers may be end-capped by acylation or esterification after polymerization or during polymerization by the use of selected chain transfer agents. This is also discussed in the Kern et al. article.

In forming copolymers, the comonomer is usually present in the polymerization reaction mixture in amounts between about 0.1 and about 20.0 weight percent, based on the weight of trioxane in the mixture, and preferably in amounts between about 0.1 and about 10.0 weight percent.

The polymerization reaction mixture may also contain small amounts of solvents. Among the suitable solvents which may be used are cyclohexane, di-n-butyl ether, benzene, ethylene dichloride, pentane, trichloroethylene, ligroin (90° to 100° C. B.P.), carbon tetrachloride, octaine, symmetrical tetrachloroethane, diethyl ether, petroleum ether (30° to 60° C. B.P.) and methylene chloride.

The preferred solvents are cyclohexane and di-n-butyl ether. The amount of solvent present in the feed polymerization mixture is usually in the range of from about 0.25 to 10.0 percent by weight of the polymerizable material present therein. All or a portion of the solvent may be introduced into the reaction zone with the polymerization catalyst, as a carrier therefor. The solvent may also be a chain transfer agent.

While a large number of polymerization catalysts for polyacetal forming materials are operable, the preferred polymerization catalysts are those containing boron fluoride. These include boron fluoride, described in U.S. Pat. No. 2,989,507 of Hudgin and Berardinelli; boron fluoride coordinate complexes with organic compounds in which oxygen or sulfur are donor atoms, described in U.S. Pat. No. 2,989,506 of Hudgin and Berardinelli; boron fluoride coordinate complexes with water, described in U.S. Pat. No. 3,200,096 by Hudgin and Berardinelli; and boron fluoride coordinate complexes with basic trivalent nitrogen or phosphorus compounds having ionization constants in water at 25° C. not higher than about $1 \times 10^{-9}$, described in U.S. Pat. No. 2,989,511 of Schnizer. Boron fluoride-ether complexes such as boron fluoride dibutyl etherate are especially preferred.

The catalyst is usually present in the polymerization mixture in the range of from about 0.0001 to 0.10 percent by weight of the trioxane, based on the catalyst's boron fluoride content. Preferably, amounts in the range of from about 0.0005 to 0.025 percent are used.

In operation, the process of the present invention includes the feeding of the polymerization feed mixture into the casing 20 by way of the nozzle 28. The polymerization mixture includes the reactants, trioxane, present in a concentration of at least 60 molar percent and a comonomer such as 1,3-dioxolane or ethylene oxide. The concentration of the comonomer introduced in the reaction is in the range of between about 0.4 and 15 mole percent. The reactants, along with a solvent such as cyclohexane are introduced in the annular opening defined by the outer wall of the conduit 52 and the inner surface of wall 54. In addition, a polymerization catalyst, a compound containing boron fluoride, is introduced concurrently with the reactants and solvents through the conduit 52 in order to prevent contact between the reactants and the catalysts in the inlet zone. In a preferred embodiment the boron fluoride catalyst is introduced in a concentration of between about 70 and 90 parts per million based on the weight of the reactants, i.e., trioxane and the comonomer.

That portion of the shafts 40 and 42 which correspond to the inlet zone 56 are provided with a flight of forward direction screws 22 and 26. Thus, the reactants are deposited in the intermeshing screw cavities, which is the space or valley formed by the screw threads. They are advanced through the screw threads to the polymerization reaction zone 58. It is emphasized that the shafts 40 and 42, disposed within the casing 20, are always rotated in the same direction. This convention should be appreciated when the direction of the threaded screw is described. Over the length of the inlet zone 56, the jacketed space 18 is provided with a suitable heat transfer fluid maintained at a temperature in the range of between about 150° F. and 200° F. The temperature of the inlet zone is purposely maintained at this elevated level to maintain the trioxane, as it enters the reaction zone, in the liquid state. Trioxane melts at a temperature of about 140° F.

As the reactants and catalyst contact and thus polymerize, the materials enter the reaction zone 58. As stated above, the reaction zone is thermally isolated from the inlet zone. Preferably the temperature in the reaction zone is in the range of between about 50° F. and 150° F. More preferably the reaction temperature in the range of between about 110° F. and 140° F. Unlike the inlet zone wherein the jacketed space 18 transfers heat to the materials within the casing 20, in the reaction zone the temperature is purposely maintained below the temperature maintained within the casing 20 in order to remove the heat of reaction and maintain the temperature in the temperature range recited above.

As the reactants enter the reaction zone 58, the elliptical plates 44 move over the half of the figure eight casing 20 over which the plates 44 rotate. This eliminates the opportunity for reactant or product to lodge on the inside surface of the casing 20. In addition, the plates 44 and 45 intermesh preventing product or reactant to lodge on the surface of the plates 44. These effects are provided in large part by the unique flattened edges 46 which move smoothly over the casing 20 and the corresponding plate 44 to crush, grind and clear material. Thus, the array of elliptical plates 44 and 45 on shafts 40 and 42 respectively bar the formation of dead spaces where material can accumulate. Dead space causes plugging of the reactor, or at least, requires the use of additional power and also reduces the heat transfer rate. This can be very deleterious in that decreased heat transfer can cause the polymerization reaction to occur at too high a temperature which adversely effects the conversion rate.

In addition to minimizing dead space the unique design of this invention enhances intimate contact between the reactants and the catalysts, thus, maximizing the degree of conversion into product, the polyacetal polymer. This intimate contact is caused in part by the reduction in particle size resulting from the pulverizing and grinding effect of the coacting elliptical plates 44 and 45. This, in turn, results in another advantage of the design of the elliptical plates of this invention. In the past, the polyacetal production was plagued by plugging of the reactor. By grinding the polymerization product into a fine powder this result is eliminated.

The essentially completely reacted polyacetal polymer exits the reaction zone 58 and enters into the outlet zone 60. The outlet zone 60 is jacketed, as are the inlet and reaction zones, and thus may be temperature controlled by the flow of a heat transfer fluid. Such jacketing is provided in those cases where the temperature of the product is much in excess of ambient. Thus, the jacketing fluid cools the reaction product within the casing 20 to approximately room temperature. In those cases where a cooling fluid is employed, it is preferably a heat transfer fluid maintained at a temperature in the range of between about 40° and 60° F. In this regard, it should be appreciated that the outlet zone 60 or 60', as well as the inlet and reaction zones 56 and 58, may be further subdivided for the purposes of temperature control by the employment of additional separating plates. The greater the number of separately controlled temperature zones the more precisely is the temperature of the reaction controlled. As those skilled in the art are aware, better temperature control leads to more efficient reaction control and thus higher conversion rates.

In the preferred embodiment wherein the forward directed threaded screw 62 is employed the polyacetal product is conveyed, in the cavities of the intermeshing screws, axially to the outlet nozzle 30. As shown in the drawings the product exits the reactor 10 axially downstream.

In another preferred embodiment of the operation of the process of this invention the nozzle means 31 is disposed downstream of the last elliptical plate. In this case, the reverse flight of screws 64 and 65 prevents the polyacetal product from moving downstream of the outlet nozzle 31, and thus the product falls directly into the nozzle for collection.

The following examples are given to illustrate the process of this invention. Since these examples are provided for illustrative purposes only, they are not intended and should not be construed as limiting the invention in any way.

EXAMPLE I

A series of runs were made employing a polymerization reactor of the type illustrated in the drawings. The reactor size was 2 inches. That is, each of the two circles making up the figure eight case was 2 inches. Alternately stated, the diameter of the screws and plates was nominaly 2 inches. The elliptical plates of this reactor were ¼ inch thick and adjoining plates were offset 45°. A series of seven runs were made employing progressively increasing feed rates. The temperature in the reaction zone was taken at several points along its length. Although the temperature was approximately the same over the entire reaction polymerization zone there is some variation and thus the temperature recorded is a range in which the lowest and highest temperatures are recited.

As noted above, each of the runs employed a progressively increasing feed rate. The reported feed rate represents the amount of trioxane fed into the reactor as measured in grams per minute. In this experiment a copolymer was produced. Thus, a second comonomer was fed into the reactor. in all of the seven below tabulated experiments two percent by weight of ethylene oxide ws additionally supplied. Although a trioxane feed rate is reported, it should be appreciated that this feed rate includes two percent of ethylene oxide. The monomeric reactants, trioxane and ethylene oxide, are fed into the reactor as a liquid.

In addition to the monomeric reactants, a catalyst is also fed into the reactor. The catalyst employed is a boron fluoride-ether complex, boron fluoride dibutyl etherate. The catalyst is fed into the reactor as part of a solution in which the solvent is cyclohexane. The catalyst is supplied at a concentration which is a function of the feed rate. The catalyst concentration is reported in the table below in terms of parts per million based on the total feed rate of the monomers. Except for one case tabulated below, this rate is constant over the entire run. However, in one run the rate was varied somewhat and a range is reported. The results of the seven runs are tabulated below in Table I.

TABLE I

| Feed Rate (qm/min) | Catalyst Concentration (ppm) | Reaction Temp. °F. | Conversion % |
|---|---|---|---|
| 160 | 81 | 114–120 | 80 |
| 220 | 81 | 120–124 | 75 |
| 340 | 80 | 123–130 | 60 |
| 625 | 73–83 | 124–138 | 55 |
| 740 | 88 | 126–132 | 47 |
| 850 | 76 | 126–134 | 45 |
| 970 | 67 | 125–133 | 29 |

The above results indicate excellent conversion rates at surprisingly low reaction temperatures. Of course, the conversion rate decreases upon increased throughput rates. It is noted, that the ability to process such a high rate as 970 grams per minute in this relatively small reactor represents an advance over previous processing rates.

EXAMPLE II

A comparison set of runs were made to determine the equivalent results attainable by employment of the single screw polyacetal polymerization reactor disclosed in U.S. Pat. No. 3,253,818. The reactor employed in this example again was equipped with a 2 inch size screw. Three sets of runs were made employing the same monomeric reactants to produce the same polyacetal copolymer. The results of this set of runs are tabulated below in Table II.

TABLE II

| Feed Rate (gm/min) | Catalyst Concentration (ppm) | Reaction Temp. (° F.) | Conversion (%) |
|---|---|---|---|
| 40 | 80 | 200 | 39.7 |
|  | 90 | 200 | 72 |
|  | 100 | 200 | 62 |
| 60 | 80 | 200 | 42.5 |
|  | 90 | 200 | 58 |
|  | 100 | 200 | 65 |
| 80 | 80 | 200 | 51 |
|  | 90 | 200 | 67 |
|  | 100 | 200 | 58.6 |

The above results indicate the superior results attainable with the process of the instant invention as exemplified in Example I. The first advantage is indicated by the much lower throughput rate attainable with the reactor of the prior art (this example). The maximum throughput attainable with the same size reactor of the prior art was one-half the minimum rate run in accordance with the process of this invention. In addition, the reaction temperatures could not be lowered below 200° F. This higher reaction temperature manifests itself in terms of increased catalyst requirement and, more importantly, lower conversion rates.

Even when employing a significantly higher catalyst rate than that employed in the process of this invention, the conversion rate in this second example was lower than in the first example, the process of the present invention. Furthermore, in order to come even close to the conversion rate of the instant invention higher concentrations of catalyst were required. The closest comparative result is the case in which 80 grams per minute were run at a catalyst concentration of 80 parts per minute. The resultant conversion was 51 percent compared to a conversion of 80 percent attainable by the process of this invention. This is even more significant when one appreciates that the throughput rate was doubled when run in accordance with the instant invention.

It is noted that the quality of the polyacetal made in accordance with Examples I and II were comparable. That is, the same quality polyacetal, as measured by various quantitative tests, was produced.

EXAMPLE III

In addition to the data reported in Example I, information relevant to the power requirements required to produce the polyacetal were recorded. Specifically, for each feed rate the rate of rotation of the two shafts as well as the net horsepower utilized was recorded. In addition, a calculated value, which is a quantitative attempt to report the horsepower efficiency of the operation, was also tabulated. This value in terms of horsepower-hour per pound of polyacetal produced is a measure of the efficiency of the design of the shafts. The lower the value of this term the more efficient is the operation. The results are tabulated below in Table III.

TABLE III

| Feed Rate (gm/min) | Screws Rate of Rotation (rpm) | Net Horsepower | Horsepower Efficiency hp-hr/lb |
|---|---|---|---|
| 160 | 18 | .30 | 0.17–.018 |
| 220 | 18 | .35 | .017 |
| 340 | 18 | .25 | .009 |
| 625 | 24–33 | .45 | .010 |
| 744 | 43 | .70 | .014 |
| 859 | 40 | .65 | .012 |
| 970 | 30 | .40 | .008 |

As indicated by the above data as the rate of throughput increases the efficiency, in terms of power requirements, is improved. Thus, the process of this invention, which permits improved throughput rates, provides improved horsepower efficiency.

EXAMPLE IV

A comparison run was made employing the process described in U.S. Pat. No. 3,442,866. In this process a double screw reactor is employed. However, this process does not disclose, or in any way make obvious, the utilization of the unique elliptical plate design found in the reactor of the process of the instant invention. The polyacetal polymerization reaction that took place in this reactor was the same reaction as in the previous examples. Thus, trioxane and ethylene oxide, present in a molar ratio of 98:2, was polymerized in the presence of a boron fluoride-dibutyl etherate catalyst. Because of the torque problems associated with this design and the fact that each of the screws had a nominal diameter of 28 millimeters the throughput rate attainable was at best an order of magnitude lower than that obtainable with the reactor described in Example III. However, it is submitted that the results obtained are comparable in that the expression for horsepower efficiency, that is, horsepower-hour/pound produced is independent of the throughput and makes comparisons possible. The results obtained in four runs are reported below in Table IV.

TABLE IV

| Trioxane Feed Rate (gms/min) | Screw Rate of Rotation (rpm) | Net Horsepower | Horsepower hp-hr/lb Efficiency |
|---|---|---|---|
| 9 | 88 | .08 | .067 |
| 12 | 56 | .056 | .035 |
| 14 | 52 | .052 | .028 |
| 16 | 49 | .051 | .023 |

It is to be emphasized that the polyacetal copolymer produced in accordance with Examples I and IV was not only the same product but was of similar quality. Furthermore, the conversion rates of the two examples were also comparable.

When a trioxane feed rate of 40 grams per minute was attempted, the power available was insufficient to turn the screws and thus, reactor "torqued out". It is noted that the 28 mm size of the reactor provides a capacity approximately one quarter of that provided for in the 2 inch size of the reactor employed in Examples I and IV. This indicates that the process of this invention provides significantly increased throughput capacity compared to the prior art process of U.S. Pat. No. 3,442,866 in that the prior art process cannot process a throughput equivalent to the minimum throughput (160 gms/min) run in accordance with the process of the present invention.

The above example indicates, in addition to the fact that this design does not permit high throughputs due to the high torque requirements, that the process of the instant invention provides more efficient power utilization than the process of the prior art described in U.S. Pat. No. 3,442,866.

The description of the preferred embodiments and examples given above are meant to be illustrative of the scope and spirit of the instant invention. These preferred embodiments and examples will make apparent, to those skilled in the art, other embodiments and examples within the scope and spirit of the invention described above. These other embodiments and examples, made apparent by this description, within the scope and spirit of this invention, are within the contemplation of this invention. Therefore the invention should be limited solely by the appended claims.

What is claimed is:

1. In a process for producing a polyacetal polymer in which a polyacetal forming polymerization mixture is introduced into a polymerization reaction zone, the mixture polymerized to form polyacetal polymer and withdrawing said polyacetal polymer from said polymerization reaction zone, the improvement which comprises pulverizing and grinding said polyacetal polymer by means of a plurality of inter-meshing elliptical shape plates provided on each shaft of a pair of shafts, said plates having flattened edges at the major axis which mesh to wipe the surface of its mating plate to form a finely divided solid polyacetal polymer which is then withdrawn from said reaction zone.

2. An improved process in accordance with claim 1 wherein said shafts each include a flight of intermeshing screws connected to said shafts at the upstream end of said shafts adjacent to said elliptical shaped plates whereby said polyacetal forming polymerization mixture is introduced into said polymerization reaction zone.

3. An improved process in accordance with claim 1 wherein said shafts each include a flight of forward direction intermeshing screws connected to said shafts at the downstream end of said shafts adjacent to said downstream end of said elliptical shaped plates whereby said polyacetal solids are withdrawn from said polymerization zone.

4. An improved process in accordance with claim 1 wherein said shafts each include a flight of intermeshing reverse direction screws connected to the downstream end of each of said shafts adjacent to the downstream end of said elliptical shaped plates, each of said shafts further characterized by terminating in an orifice plug disposed downstream of said flight of reverse direction screws.

5. An improved process in accordance with claim 1 wherein said polymerization reaction zone is thermally isolated.

6. An improved process in accordance with claim 1 wherein said plurality of elliptically shaped plates on each of said shafts are disposed such that the major axis of adjoining plates are offset from one another at an angle of 45°.

7. An improved process in accordance with claim 1 wherein said plurality of elliptically shaped plates on each of said shafts are disposed such that the major axis of adjoining plates are offset from one another at an angle of 60°.

8. An improved process in accordance with claim 1 wherein said plurality of elliptically shaped plates on each of said shafts are disposed such that the major axis of adjoining plates are offset from one another at an angle of 90°.

9. In a process for producing a polyacetal polymer comprising at least 60 mole percent of recurring ($-CH_2O-$) units and from 0.4 to about 15 mole percent of ($-OR-$) units wherein R is a divalent radical containing at least 2 carbon atoms directly linked to each other wherein a polyacetal forming polymerization mixture is introduced into an inlet zone, said mixture thereafter conveyed into a polymerization reaction zone, the polyacetal forming polymerization mixture polymerized in said reaction zone to form said polyacetal polymer and said polyacetal polymer conveyed into an outlet zone where said polyacetal polymer is withdrawn, the improvement which comprises pulverizing and grinding said polyacetal polymer whereby said polyacetal polymer by means of a plurality of inter-meshing elliptical shape plates having flattened edges at the major axis, said plates provided on each of a pair of shafts, each of said plates meshing with its mating plate, on said other shaft of said pair of shafts, whereby the surface of said mating plate is wiped, said polyacetal polymer thereafter conveyed into said outlet zone in the form of a finely divided solid.

10. An improved process in accordance with claim 9 wherein said polymerization mixture comprises trioxane, a comonomer and a polymerization catalyst.

11. An improved process in accordance with claim 10 wherein said comonomer is a cyclic ether having adjacent carbon atoms.

12. An improved process in accordance with claim 11 wherein said cyclic ether has the chemical structure

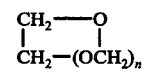

where $n$ is an integer of from 0 to 2.

13. An improved process in accordance with claim 12 wherein said cyclic ether is ethylene oxide.

14. An improved process in accordance with claim 10 wherein said polymerization catalyst includes boron fluoride.

15. An improved process in accordance with claim 14 wherein said boron fluoride catalyst is present in a concentration in the range of between about 70 to 90 parts per million based on the weight of said trioxane and said comonomer.

16. An improved process in accordance with claim 9 wherein said reaction zone is maintained at a temperature in the range of between about 110° and 140° F.

17. An improved process in accordance with claim 1 wherein said reaction zone comprises an elongated casing substantially following the outer boundaries of said pair of shafts.

18. An improved process in accordance with claim 9 wherein said reaction zone comprises an elongated casing substantially following the outer boundaries of said pair of shafts.

* * * * *

Dedication 4,105,637.—*Michael Semanchik*, Lebanon and *David M. Braunstein*, Fanwood, N.J. PROCESS FOR PRODUCING A POLYACETAL POLYMER. Patent dated Aug. 8, 1978. Dedication filed Mar. 5, 1982, by the assignee, *Celanese Corp.*

Hereby dedicates said patent to the Public.

[*Official Gazette June 1, 1982.*]